Figure 1:
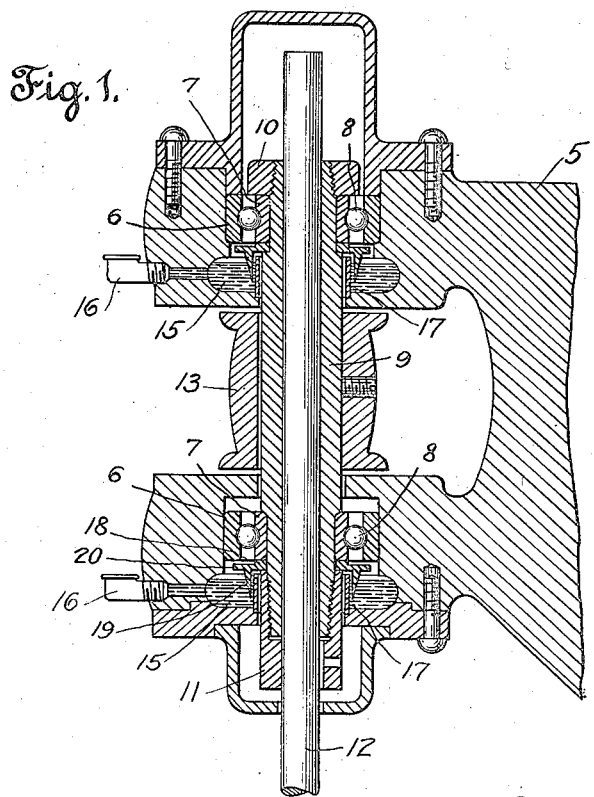

Sept. 11, 1923.

H. R. REYNOLDS

APPARATUS FOR LUBRICATING BALL BEARINGS

Filed Sept. 17, 1921

Inventor
Harry R. Reynolds
By his Attorneys
Mitchell & Allyn

Patented Sept. 11, 1923.

1,467,686

UNITED STATES PATENT OFFICE.

HARRY R. REYNOLDS, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

APPARATUS FOR LUBRICATING BALL BEARINGS.

Application filed September 17, 1921. Serial No. 501,342.

*To all whom it may concern:*

Be it known that I, HARRY R. REYNOLDS, a citizen of the United States of America, residing at New Britain, Connecticut, have invented a new and useful Apparatus for Lubricating Ball Bearings, of which the following is a specification.

My invention relates to apparatus for lubricating ball bearings. In the operation of such bearings some lubrication is essential, but it is desirable that the lubricant be supplied in small quantities and at regular intervals. With high speed bearings, if the lubricant be too freely supplied or if the bearing be submerged in or operate in oil, the bearing will quickly heat up and the friction of the bearing will be excessive.

It is an object of my invention, therefore, to provide a novel means for lubricating a ball bearing, whereby the lubricant will be supplied in comparatively small quantities.

It is a more specific object to provide novel means for breaking the lubricant up into fine particles, some of which reach the bearing to be lubricated.

Other objects and features of invention will be apparent as the specification proceeds.

In the preferred form of apparatus embodying my invention a reservoir or container for oil is situated at some distance from the bearing, and means are provided, preferably on a part of the rotating member, as a shaft, for receiving oil from the reservoir and centrifugally "slinging" it outwardly, to divide the oil into fine particles, some of which may reach the bearing for lubricating the latter. The oil particles which are slung outwardly contact with a surface and are broken up into still finer particles, which may float in the space adjacent to and reach the bearing surfaces for lubricating the latter.

In the drawings I have shown, for illustrative purposes only, two embodiments of my invention. In said drawings—

Figure 2:
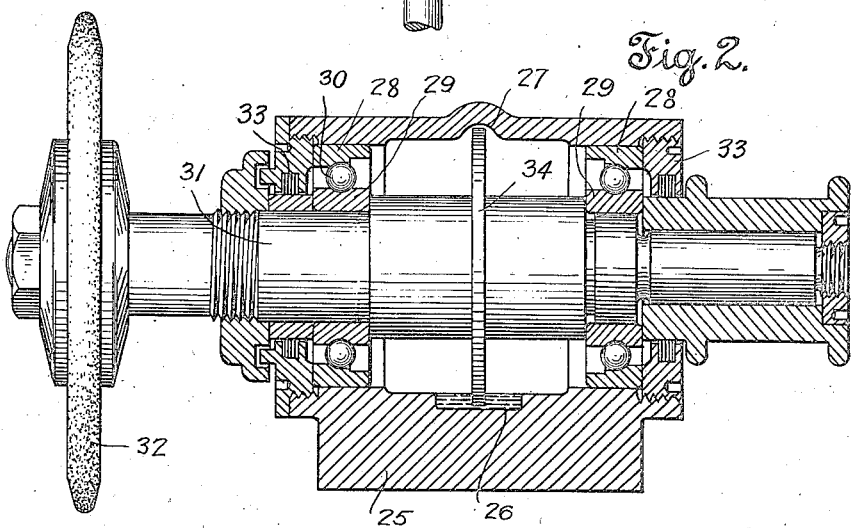

Figure 1 is a vertical sectional view of a vertical spindle and bearing, disclosing features of my invention; and Fig. 2 is a vertical sectional view of a horizontal spindle and bearings, disclosing a slightly different form of the invention.

Referring first to Fig. 1, 5 indicates any suitable type of support or bracket for the spindle and bearing. In the specific form shown there are mounted two outer bearing rings 6, 6 and two corresponding inner rings 7, 7. Suitable anti-friction members, such as balls 8, 8 are interposed between the inner and outer rings. In the form shown the inner rings are mounted on a sleeve 9, and suitable means, such as the nuts 10, 11, secure the rings to the sleeve. The shaft 12 passes through the sleeve and is held therein in any suitable manner. 13 indicates a driving pulley secured to the sleeve 9 for driving the spindle.

Below each bearing is an oil reservoir 15, into which lubricant may be introduced through any suitable conduit 16. In the form shown the reservoir is formed in the supporting bracket 5. An upstanding flange or sleeve 17 forms the inner edge of the reservoir, and this sleeve in the form shown is spaced from the spindle sleeve 9.

Means are provided for receiving oil from the reservoir and causing the latter to be broken up into fine particles, some of which may ultimately reach the bearing surfaces. In the specific disclosure thimbles or washers 18 are secured upon the sleeve 9. Each of these washers has a downwardly projecting flange 19 dipping into the oil in the reservoir. Each washer likewise has an outwardly projecting flange 20. It will be noted that the flanges 19 taper or diverge upwardly slightly for a purpose to be described. The washers just described may be conveniently termed "oil slingers."

In the embodiment disclosed in Fig. 2 the support or housing 25 is provided with an oil reservoir 26 and is preferably provided with an annular recess or depression 27. Bearing rings 28 are secured in the end of the support or housing 25, and inner rings 29 are mounted opposite the outer rings. Suitable anti-friction members 30 are provided between the rings. The inner rings are mounted on a shaft 31, which may be driven in any suitable manner. In the specific instance disclosed the shaft 31 drives a grinding wheel 32. Any suitable end caps and dust rings 33 may be provided for the housing.

On the shaft I have shown a flange or washer 34 constituting an "oil slinger" which is rotatable with the shaft and dips into the oil in the reservoir 26.

The operation is as follows:

When the shaft 12 is rotated the oil slinger dipping into the oil in the reservoir will pick up a small quantity of oil. Due to the upward divergence of the flange 19 the oil picked up from the reservoir will be carried upwardly and outwardly on the flange 20, due to the centrifugal action. The oil carried out to the flange 20 will be centrifugally slung from the oil slinger and will be in comparatively small particles. The particles being projected from the periphery of the flange 20 at relatively high speed will strike against the surfaces of one of the parts, such as the part of the housing surrounding the oil slinger, and in striking the surface will "splatter" or be broken into still finer particles, which will rebound from the surface. Some of these fine particles will reach the bearing surface and cause the latter to be lubricated.

With the proper oil and the proper speed the particles will be comparatively fine and might be said to form an oil mist, or to create an oily atmosphere in the space adjacent the bearings. Some of the particles will float in the air and finally reach the surfaces to be lubricated.

The form disclosed in Fig. 2 will operate in a manner similar to that just described. The oil slinger 34 dipping into the oil in the reservoir 26 will pick up a small quantity of oil when the shaft is rotated. This oil will be projected or slung from the oil slinger and against the inner surface of the housing, and the oil particles will be formed in a manner similar to that described in connection with Fig. 1. Some of the particles or the oil mist will reach the bearing surfaces to be lubricated.

It should be noted that, by the method of lubrication herein disclosed, but very small quantities of oil are supplied to the bearings, and this oil is supplied regularly or continuously. The quantity and regularity of the supply will, of course, depend upon the oil level and the speed and general arrangement of the oil slinger and passages adjacent the bearings. The oil level in the reservoir should be so low that it will be impossible to cause a rise in the oil level so as to flood the bearing, since it is desirable to permit only the oil mist to reach the bearing and thus prevent an excess of lubricant on the surfaces. The proportions of the oil slinger and other parts are preferably such as to prevent a direct splash from the splash surface to reach the bearing. The oil slinger rotating within the body of oil in the reservoir will generate but slight friction, whereas, with a ball bearing rotating submerged or partly submerged in oil, the oil will be caused to foam and will heat up and might even overflow the bearings, with a consequent waste of oil and possible damage to objects beneath the bearing.

By the employment of the mechanism as herein disclosed a correct quantity of oil may be supplied to the bearing and there is no danger of the bearing running dry, nor is there danger of the bearing heating up due to friction created when a bearing is run in oil.

The term "ball bearing" is used herein to define anti-friction bearings generally.

While I have gone into some detail in explaining my improved lubricating means, I wish it understood that various changes may be made within the scope of the appended claim.

I claim:

In a device of the character described, a support, a rotary shaft, a ball bearing including an outer bearing ring on said support, an oil reservoir below said ball bearing for carrying a supply of lubricant, an oil slinging projection on said shaft for receiving lubricant from said reservoir and directing it outwardly during the rotation of said shaft and against an inner surface of said support for causing the oil to splash and break up into fine particles so as to create an oil mist in the region of said ball bearing for lubricating the latter, the outer edge of said oil slinger projecting outwardly beyond the inner periphery of the outer bearing ring and lying adjacent thereto, whereby the direct splash of lubricant from the inner surface of the support to the ball bearing proper is prevented and the bearing lubricated by the oil mist created as aforesaid.

HARRY R. REYNOLDS.